US012761110B2

(12) United States Patent
Legros et al.

(10) Patent No.: US 12,761,110 B2
(45) Date of Patent: Oct. 13, 2026

(54) METHOD AND DEVICE FOR MEASURING INTERFACES OF AN OPTICAL ELEMENT

(71) Applicant: FOGALE NANOTECH, Nîmes (FR)

(72) Inventors: Eric Legros, Nîmes (FR); Sylvain Petitgrand, Caissargues (FR)

(73) Assignee: FOGALE NANOTECH, Nîmes (FR)

( * ) Notice: Subject to any disclaimer, the term of this patent is extended or adjusted under 35 U.S.C. 154(b) by 190 days.

(21) Appl. No.: 18/698,156

(22) PCT Filed: Oct. 6, 2022

(86) PCT No.: PCT/EP2022/077761
§ 371 (c)(1),
(2) Date: Apr. 3, 2024

(87) PCT Pub. No.: WO2023/057539
PCT Pub. Date: Apr. 13, 2023

(65) Prior Publication Data
US 2024/0402039 A1 Dec. 5, 2024

(30) Foreign Application Priority Data
Oct. 8, 2021 (FR) ...................................... 2110695

(51) Int. Cl.
*G01M 11/02* (2006.01)
*G01B 9/02055* (2022.01)
(Continued)

(52) U.S. Cl.
CPC ....... *G01M 11/025* (2013.01); *G01B 9/02065* (2013.01); *G01B 9/02091* (2013.01);
(Continued)

(58) Field of Classification Search
CPC ........... G01M 11/025; G01M 11/0271; G01M 11/0257; G01M 11/0264; G01M 11/0221;
(Continued)

(56) References Cited

U.S. PATENT DOCUMENTS 11,808,656 B2 * 11/2023 Courteville ........ G01B 11/2441

FOREIGN PATENT DOCUMENTS

EP 2369319 A1 9/2011
WO WO-2020178234 A1 * 9/2020 ............. G01B 11/14
WO 2020/245511 A1 12/2020

OTHER PUBLICATIONS

International Search Report and Written Opinion received for PCT/EP2022/077761, mailed Nov. 25, 2022.
(Continued)

*Primary Examiner* — Kara E. Geisel
*Assistant Examiner* — Jonathon Cook
(74) *Attorney, Agent, or Firm* — Greer, Burns & Crain, Ltd

(57) ABSTRACT

A method for measuring an item of geometric information of an interface of an optical element including interfaces, with a device configured to direct a measurement beam towards the optical element so as to pass through at least one of the interfaces and be reflected by the interface and generate a reflected beam, to selectively detect an interference signal between the reflected beam and a reference beam, the method including positioning a coherence area at an interface; measuring the interface so as to produce interference signals; and processing the signals including constructing a mathematical interface based on a sub-set of interference signals, determining, based on the mathematical interface and an expected shape of the interface, an item of geometric information of the interface.

16 Claims, 3 Drawing Sheets

(51) Int. Cl.
*G01B 9/02091* (2022.01)
*G01B 11/14* (2006.01)
*G01B 11/24* (2006.01)

(52) U.S. Cl.
CPC .......... *G01B 11/14* (2013.01); *G01B 11/2441* (2013.01); *G01M 11/0221* (2013.01); *G01M 11/0271* (2013.01)

(58) Field of Classification Search
CPC .. G01B 9/02091; G01B 11/14; G01B 11/2441
See application file for complete search history.

(56) References Cited

OTHER PUBLICATIONS

French Search Report received for Application No. 2110695, dated May 31, 2022.

* cited by examiner

[Fig.1]
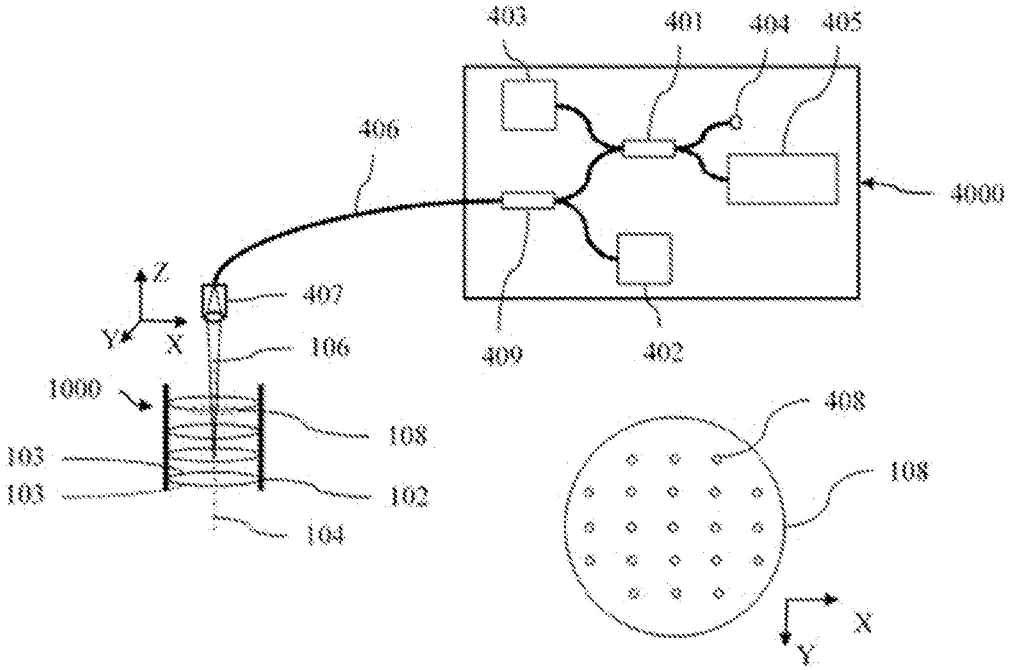
[Fig.2]
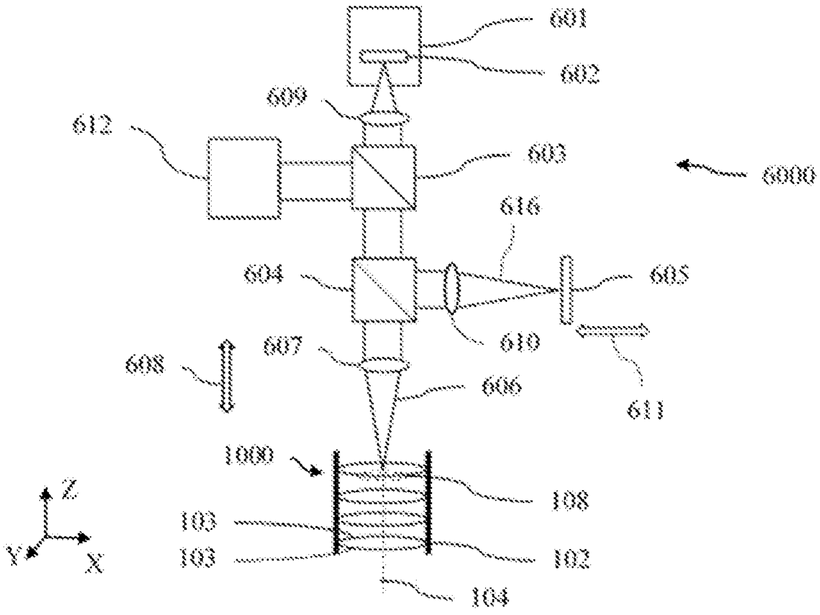

[Fig.3]
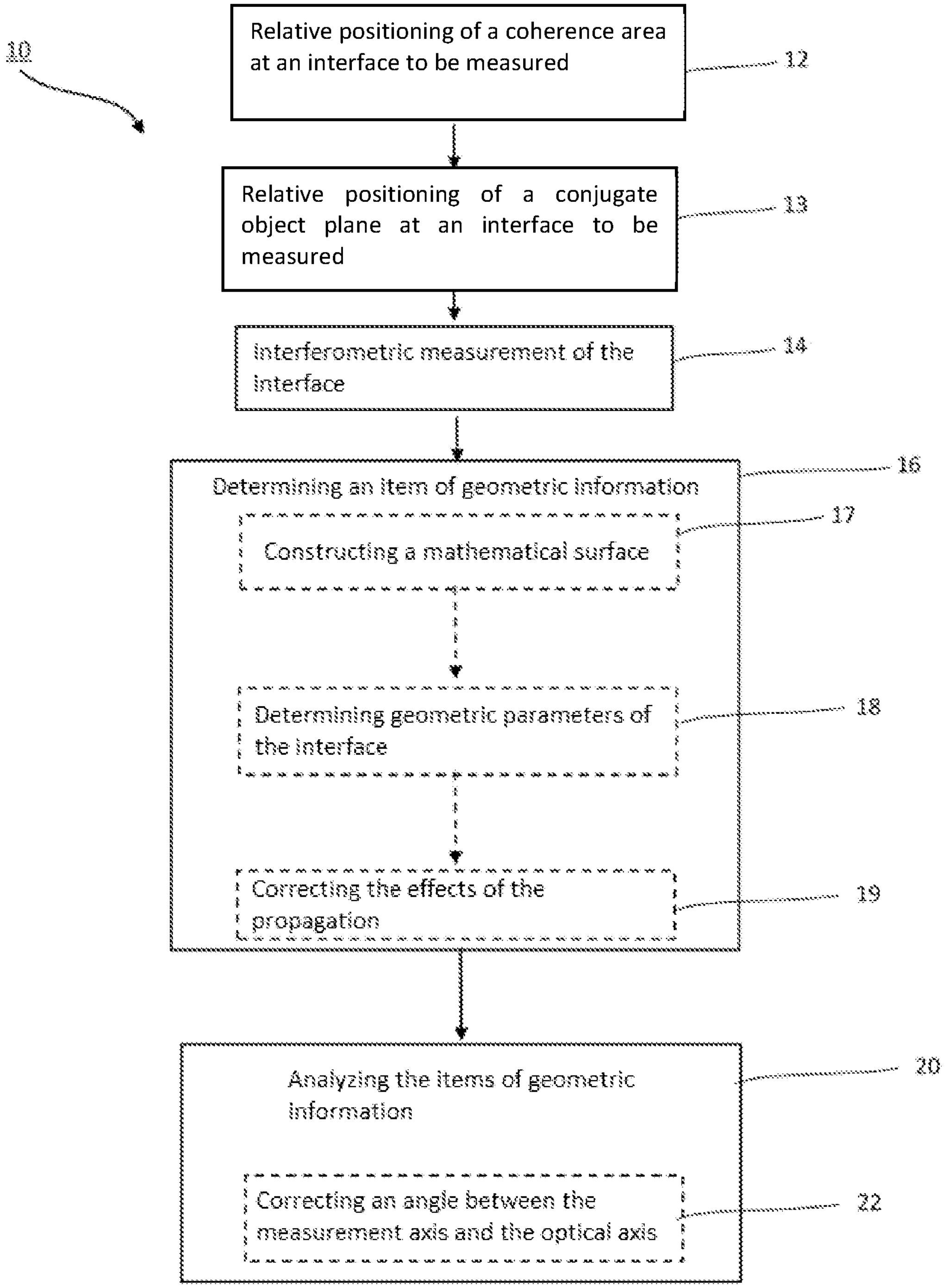

[Fig.4]
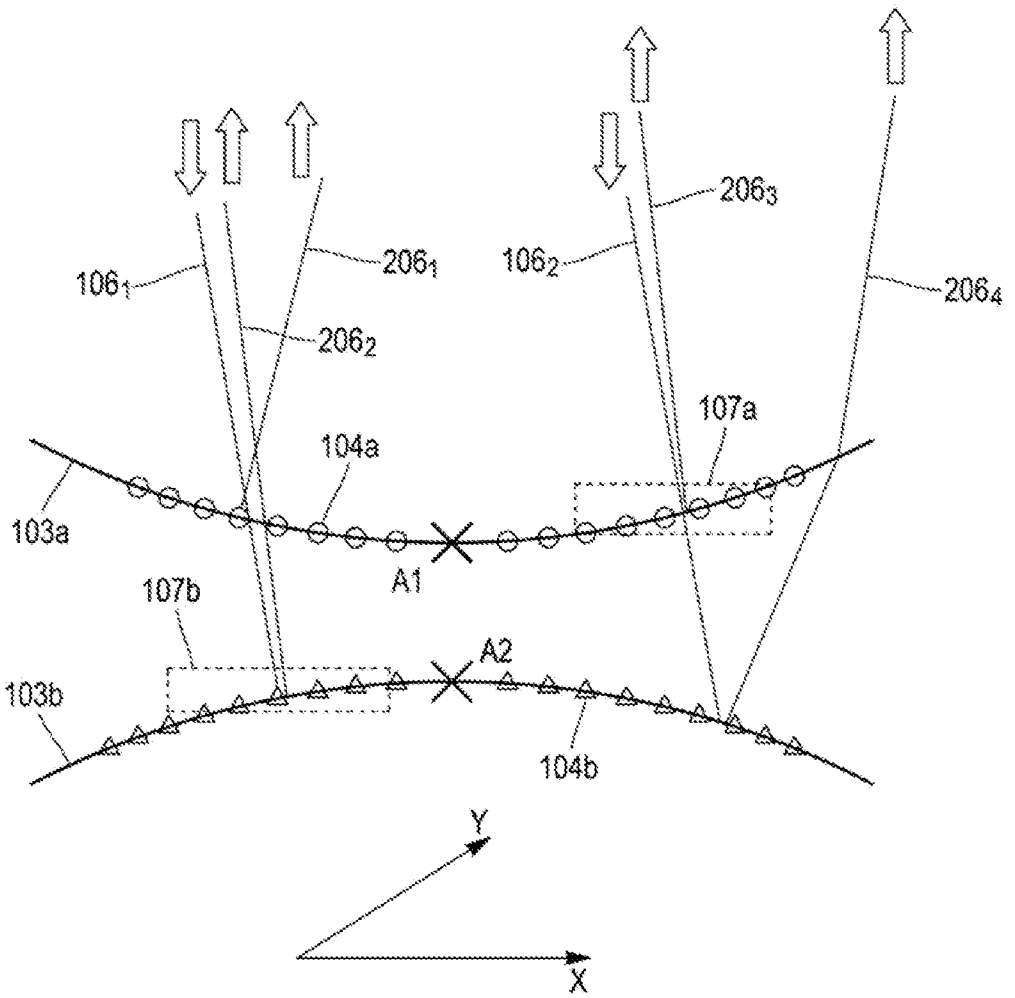

METHOD AND DEVICE FOR MEASURING INTERFACES OF AN OPTICAL ELEMENT

BACKGROUND

The present invention relates to a method for measuring an item of geometric information of interfaces in an optical element comprising at least two interfaces. It also relates to a device for measuring an item of geometric information of interfaces in such an optical element.

The field of the invention is, non-limitatively, that of the optical control and measurement systems, in particular for the manufacture of optical elements.

Optical elements, such as optical assemblies or imaging objectives, are generally constituted by one or a plurality of lenses and optionally other components intended to shape optical beams. These components, or these lenses, can be assembled in the form of stacking in a support such as a barrel.

The optical performance of an optical element, for example an imaging objective, depends essentially on the manufacturing precision of the optical components (such as the lenses) of which it is composed, and the precision with which they are positioned in the assembly. During the manufacture of the optical elements, it is then necessary to control or measure positions of constituent elements or spaces between constituent elements, along a measurement axis such as the optical axis of the optical element, in order to determine for example elements that are non-compliant or poorly positioned, deformed, or tilted.

To this end, it is known in particular to use low-coherence interferometry techniques. A measurement optical beam originating from a broad-spectrum optical source is propagated through the surfaces of the optical element. The reflections of the beam on these surfaces are collected and analyzed, making them interfere with one another and/or with a reference beam in order to determine the differences in the optical paths between interfering beams, and to deduce therefrom the positions and/or distances between corresponding surfaces or interfaces. Thus it is possible, for example, to determine thicknesses of lenses, distances between lenses and/or positions of lenses in an optical assembly.

Such measurement techniques generally operate by retro-reflection. The measurement optical beam is generally incident on all the surfaces to be measured with a normal or perpendicular incidence, so as to generate a reflected wave that can be captured by the measurement system. For measuring an optical assembly, this condition generally involves the need to superpose or align the measurement beam with the optical axis of the assembly, and in particular the lenses of which it is composed. Measurements of thicknesses and of separation of lenses are mainly carried out. In practice, to obtain appropriate levels of accuracy, it is necessary to be able to position the measurement beam with respect to the optical axis of an assembly with an accuracy, for example, of the order of one micron for objects having dimensions of several millimetres. Another example of difficulty relates to the measurements of separation distances of lenses that are very close together, for example of the order of 15 to 30 μm, that are difficult to resolve with the known methods.

SUMMARY

A purpose of the present invention is to overcome these drawbacks.

In particular, a purpose of the invention is to propose a measurement method and device for measuring geometric parameters of interfaces or of surfaces of an optical element comprising at least two interfaces, this device and this method allowing improved measurements of interfaces in an optical assembly.

Another purpose of the present invention is to propose a measurement method and device suitable for measuring or controlling the positioning of interfaces in an optical element through other interfaces of this optical element.

Yet another purpose of the present invention is to propose a measurement method and device for measuring the relative positions of several interfaces of an optical element making it possible to improve the process for manufacturing individual optical elements or assemblies of several optical elements.

At least one of these purposes is achieved with a measurement method, for measuring an item of geometric information of an interface to be measured of an optical element comprising at least two interfaces, the method being implemented by a measurement device comprising interferometric measurement means with at least one optical sensor and a low-coherence source, configured to direct a measurement beam towards the optical element so as to pass through at least one of the two interfaces, and to be reflected by the interface to be measured and generate a reflected measurement beam, and to selectively detect an interference signal resulting from interferences between the reflected measurement beam and a reference beam, the device also comprising positioning means and digital processing means, the method comprising the following steps:

- relative positioning, by the positioning means, of a coherence area of the interferometric measurement means at an interface to be measured;
- measuring the interface, by the interferometric measurement means, so as to produce a plurality of interference signals corresponding to a plurality of measurement points on the interface; and
- processing the interference signals by the digital processing means, the processing comprising the following steps:
  - constructing a mathematical interface based on at least one sub-set of interference signals for the interface,
  - determining, based on the mathematical interface and an expected shape of at least one first section of the interface, an item of geometric information of the interface to be measured.

Within the scope of the present invention, an "optical element" can denote any type of optical object, intended for example to be inserted in an optical beam, to shape an optical beam, and/or to produce an image. It can denote for example:

- a single optical component such as a lens or a beam splitter;
- an assembly of lenses and/or other optical components, such as an imaging or camera objective, or a device for shaping an optical beam.

An optical element can in particular be constituted by, or comprise, refractive elements such as lenses. These components, or these lenses, can in particular be assembled in a barrel, this barrel being capable of also containing spacers and/or beam splitters, such as filters for example.

The method according to the present invention makes it possible to carry out measurements of interfaces of an optical element, and in particular stacked interfaces, in order to deduce therefrom the topology of these interfaces. These interfaces can for example comprise surfaces of lenses. The measurements make it possible to determine, for example, geometric shapes and positions of the interfaces, or a tilt or a decentration of a lens in the optical element, or of one face of a lens with respect to the other face thereof. It is also possible to deduce thickness measurements and the refractive index of the material of a lens composing the optical element.

These measurements can be produced with a measurement beam of an interferometric sensor illuminated by a low-coherence light source. The measurement beam defines a measurement axis of the measurement device. A coherence area of the interferometric measurement means is relatively positioned at at least one interface to be measured. The interface to be measured can be a "buried" interface, i.e. one of the interfaces inside the optical element. In order to reach such a buried interface, the measurement beam must therefore pass through other interfaces of the optical element.

By "coherence area" is meant the area in which interferences between the measurement beam and a reference beam can form on the sensor. The coherence area can be displaced by varying the difference in the length of the optical path between the two beams, for example by modifying the optical length of one or both of the beams. When the coherence area is located at an interface, interference signals between the measurement beam reflected by this interface and the reference beam can be acquired.

The method according to the invention makes it possible to selectively detect an interference signal for each section of interface at which the coherence area is positioned, i.e. for each surface located in the coherence area. In fact, the coherence length of the light source is adjusted so as to be shorter than a minimum optical distance between two adjacent interfaces of the optical element. Thus, for each measurement, a single interface is located in the coherence area, and therefore an acquired interference signal only comprises the contribution from a single interface, or only originates from a single interface.

The interference measurements are carried out according to a field of view determined by the measurement means of the device. The measurements can thus be performed either in full-field, or by scanning the field of view.

Each section of interface is measured at a plurality of measurement points on this interface, so as to produce a plurality of interference signals. The measured area can cover all or only part of the interface in question. It is not necessary to position the coherence area centred at the interface. The interface can also be measured outside of a central area, for example at the periphery.

Processing the interference signals, by digital processing means, comprises constructing a mathematical interface based on at least one sub-set of interference signals acquired for the section of interface. In fact, interference signals acquired at different positions on the section of interface with respect to an axis of the optical element are used to calculate a mathematical surface or interface, representing the measured area of the interface. Based on this mathematical representation of a part or the entirety of the interface, and considering an expected shape of the interface, an item of geometric information of the interface can be determined.

This geometric information can relate to the optical shape and/or the geometric shape of the section of interface to be measured, and/or the optical, or geometric, distances, representative of the shape and/or the position of the interface.

The geometric information can comprise geometric parameters of the interface such as:

- the position of the apex, with respect to an axis of the optical element, or with respect to the position of the apex of another interface,
- the centre of curvature, with respect to an axis of the optical element, or with respect to that of another interface,
- the optical shape of the profile of the interface, and/or
- the optical axis, represented, for example, by a normal to the interface at the apex point, with respect to an axis of the optical element.

The item of geometric information obtained can be utilized, during an analysis step, to produce other items of information relating to the interface and/or the optical element, such as:

- a decentration and/or a tilt of the interface;
- a relative position, a decentration and/or a tilt of one interface with respect to another, a relative tilt between lenses or along an axis and between interfaces of one and the same lens;
- an optical distance between characteristic points of two interfaces, as well as the thickness of lenses or the spacing ("air gap") thereof;
- the optical axes;
- the offset in position of the apexes of lenses; and/or
- relative angles between lenses or with respect to a reference (such as the axis of the barrel or the axis of the measurement device).

The expected shape of the interface can be a surface that is typical or plausible for the interface in question. For example, for a lens, the expected shape for the two interfaces can be a portion of a sphere.

The method according to the present invention makes it possible to determine geometric information of interfaces of an optical element reliably and independently of the position of the measurement beam with respect to the interface. By virtue of the construction, based on a set of interference signals for the interface, of the mathematical interface representing an area or part of the measured interface, the items of geometric information can be obtained by comparing this mathematical interface with an expected shape. Thus, by measuring only a part of the interface, an item of geometric information relating to the entire interface, such as the profile shape thereof, can be deduced. Thus, in particular, it is not necessary to position the measurement beam at the centre of the interface in order to determine the apex thereof.

Also, it is possible to determine values relating to distance (thickness, separation between interfaces) indirectly based on points deduced from the comparison between the expected shape and the mathematical interface, these points not necessarily being measured directly. Consequently, it is possible to achieve resolutions of separation between different points of interfaces that are better than a theoretical limit that is linked to the coherence length imposed by the light source utilized, by placing the measurement beam in areas spaced further apart than this limit of the interfaces in question.

The first section of the interface can comprise a surface element, or several different surface elements.

Thus, the geometric information can be determined for a surface element belonging to the first section of the interface, or else for a surface element not belonging to the first section of the interface.

The shapes or distances called "optical" are the shapes or distances as they are "seen" by the measurement beam. The distances or shapes of geometric surfaces are deduced therefrom by taking into account the refractive index of the media passed through by the measurement beam.

Moreover, when the measurement beam passes through interfaces before the measured interface, the interference signal is representative of an “apparent” shape or distance insofar as it includes the contribution of the interface or interfaces passed through, in particular when these interfaces are situated between two media having different refractive indices, and thus deflect or modify the measurement beam by refraction and/or diffraction depending on their shape. It is thus necessary to take into account the shape of these interfaces that are passed through, as explained hereinafter, in order to obtain the “real” geometric shape of the measured interface.

According to an embodiment, the step of constructing the mathematical interface can be performed by producing a measurement with an item of relative position information of the interface and/or a measurement of amplitude of the interference signal, for each interference signal of the subset of interference signals.

These characteristic measurements of the interference signals can be stored in table form as a function of the position of the measurement beam on the interface in a plane perpendicular to the measurement axis, for all the interfaces of the optical element. The position information can be provided, for example by the positioning means of the coherence area, calculations of the phases of the interference signals or topography, etc.

The expected shape of the interface can comprise an interpolation function for interpolating the measurement points.

The interpolation function can be, for example, a conventional function such as a polynomial of order n.

Interpolation functions are particularly suitable when only parts of the interface are measured and for which it is not necessary to obtain a complete profile.

Alternatively, the expected shape of the interface can comprise a theoretical profile of at least the first section of the interface.

The theoretical profile can be, for example, a spherical profile.

According to an embodiment, the step of determining geometric information can be performed by the following steps:

- deducing parameters of a model or of an analytical formulation of the first section of the interface;
- modelling the shape of a second section of the interface to be measured, based on the parameters deduced, the second section of the interface being equal to or different from the first section of the interface.

When the second section of the interface is equal to or comprised within the first section, the shape of the second section can in particular be modelled by interpolating the model or the analytical formulation of the first section.

When the second section of the interface goes beyond the first section, the shape of the second section can in particular be modelled by extrapolating the model or the analytical formulation of the first section.

According to an example, determining the geometric information can be performed by means of an equation having variable parameters, such as those determining a translation and/or a rotation of the interface. The local curvature of the interface can also be considered as variable.

The use of an equation allows a very compact representation of the interface. Furthermore, for interfaces for which certain symmetries are expected, such as portions of a sphere, the equation can intrinsically contain concepts of symmetry.

At least the step of positioning of the coherence area and the measurement step can be implemented sequentially, or successively, in order to measure the geometric information of different interfaces to be measured.

Thus, all of the interfaces of an optical element can be measured, for example, starting with the top interface and finishing with the bottom interface, passing through all of the “buried” intermediate interfaces, without it being necessary to turn over or manipulate the optical element.

The processing of the interferometric signals acquired for the successive interfaces can be performed sequentially, between measurements over the different interfaces, or once all the interference signals have been acquired for all of the interfaces.

Advantageously, the step of processing the interference signal can also comprise a correction step taking into account an item of geometric information of the interfaces passed through by the measurement beam, in order to obtain an item of geometric information of the interface to be measured.

In fact, as explained above, during measurement of the surfaces or interfaces “buried” in the optical element, the items of geometric information measured can also depend on the media and the shapes of the interfaces passed through by the measurement beam before reaching these buried surfaces, in particular due to modifications of wavefronts by abrupt changes in refractive index and different curvatures of the interfaces passed through, and possibly aberrations introduced. In this case, a correction must be applied in order to determine the real items of geometric information of the interfaces.

In order to carry out this correction, it is possible to use a light propagation model and prior knowledge, or knowledge acquired during previous measurements on the optical element, such as the refractive indices of materials and positions and shapes of interfaces passed through.

Advantageously, the method can also comprise a step of correcting the angle of an optical axis of the optical element with respect to a measurement axis.

In fact, it is possible for the optical axis of the optical element not to coincide with the measurement axis.

Determining one or more items of geometric information of the interface to be measured can be performed again taking into account the angle correction. This correction step makes it possible to obtain items of geometric information of the interface that are more precise.

This supplementary step of angle correction can consist of additional measurements in order to find another coordinate system associated with the optical element, rather than with the measurement device.

According to another embodiment that is in no way limitative, the step of processing the interference signals can implement a method of calculation by digital holography in an implementation of the invention according to a full-field detection.

For each interference signal or interferogram stored, a digital holography method can be used to digitally reconstruct the interface in question, by simulating the process of illuminating the interferogram on the sensor with a digital reference wave. Such a method has the advantage of only requiring a single image or interference signal acquisition in order to calculate the shape of an optical surface.

According to another aspect of the invention, a measurement device is proposed for measuring an item of geometric information of an interface to be measured of an optical element comprising at least two interfaces, the device comprising:

- interferometric measurement means comprising at least one low-coherence light source and at least one optical sensor, configured to:
  - form at least one measurement beam and at least one reference beam,
  - direct the measurement beam towards the optical element so as to pass through at least one of the at least two interfaces and to be reflected by the interface to be measured and generate a reflected measurement beam,
  - selectively detect a plurality of interference signals resulting from interferences between the measurement beam reflected by the interface to be measured, respectively, and the reference beam for a plurality of measurement points on the interface;
- positioning means configured to position a coherence area relative to the interferometric measurement means at the interface to be measured; and
- digital processing means configured to:
  - construct a mathematical interface based on at least one sub-set of interference signals for the interface,
  - determine, based on the mathematical interface and an attenuated shape of the interface, an item of geometric information of the interface to be measured.

According to an embodiment, the interferometric measurement means can comprise an interferometric sensor, called point mode interferometric sensor, configured to detect a point signal of interferences at a point of the field of view.

In this case, a plurality of interferometric signals is acquired by scanning the entire field of view according to a plurality of measurement points on the interface, in order to obtain items of shape information over the entire interface.

Alternatively or in addition, the interferometric measurement means can comprise an interferometric sensor, called full-field interferometric sensor, configured to detect a full-field interference signal in the field of view.

In this case, the interface to be measured can be imaged according to the field of view in a single measurement.

According to an example, the device can comprise an interferometric sensor with a Michelson interferometer.

According to another example, the device can comprise an interferometric sensor with a Mach-Zehnder interferometer.

The positioning means can be configured to position the coherence area successively at different interfaces of the optical element.

This makes it possible to acquire and process interferometric signals for each interface sequentially and separately, in order to obtain items of shape information for all of the interfaces of the optical element.

The device according to the invention can also comprise displacement means configured to displace the optical element with respect to the measurement beam in a plane perpendicular to a measurement axis.

Thus, in the case of a point-mode interferometric sensor, for example, the field of view can be scanned according to a plurality of measurement points.

Likewise, in the case of a full-field interferometric sensor, the field of view can be scanned according to a plurality of partial fields of view.

The device according to the invention can also comprise angular displacement means configured to displace an optical axis of the optical element with respect to a measurement axis.

By virtue of the positioning means and the displacement means, it is also possible to position the coherence area at a desired location on the interface to be measured, and in particular in the peripheral areas, spaced apart from the optical axis of the optical element.

The method and the device according to the invention can be utilized, in particular, for measuring optical elements or optical assemblies during production thereof, for example objectives formed of lenses or microlenses such as smartphone objectives, or for the automotive industry.

They make it possible in particular to obtain or to construct characteristic geometric values for interfaces of interest in an optical element, compare the expected and measured characteristic values with threshold values and thus validate or reject a component of an optical element during the production process.

BRIEF DESCRIPTION OF THE DRAWINGS

Other advantages and characteristics will become apparent on examining the detailed description of examples that are in no way limitative, and from the attached drawings, in which:

FIG. 1 is a diagrammatic representation of an example measurement device that can be utilized within the scope of the present invention;

FIG. 2 is a diagrammatic representation of another example measurement device that can be utilized within the scope of the present invention;

FIG. 3 is a diagrammatic representation of a non-limitative embodiment example of a measurement method according to the present invention; and FIG. 4 is a diagrammatic representation of an example of an optical element to be measured, in particular by utilizing the measurement method of the invention.

DETAILED DESCRIPTION

It is well understood that the embodiments that will be described hereinafter are in no way limitative. Variants of the invention can be envisaged in particular comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, elements common to several figures may retain the same reference.

The measurement method according to the present invention can implement different interferometry techniques. It can in particular utilize a measurement device based on a low-coherence interferometer operating in point mode, or based on a full-field low-coherence interferometer.

A device according to the present invention, for measuring an item of geometric information of an interface to be measured of an optical element comprising at least two interfaces, comprises an interferometer with at least one low-coherence light source and at least one optical sensor. The source(s) are configured to direct at least one measurement beam towards the optical element so as to pass through the interfaces. The interferometer is configured to produce an interference signal originating from the interference between the measurement beam reflected by the interface to be measured and a reference beam. The interference signal is detected by the sensor. This interference signal contains a measurement of the optical shape of the interface from which the measurement beam is reflected, and thus items of geometric information thereof. One or more interference signals are thus acquired according to a field of view on the interface.

The device according to the invention also comprises positioning means for relative positioning of a coherence area of the interferometer at the interface to be measured of the object.

The device also comprises digital processing means, configured to produce, based on the measured interference signal, an item of geometric information of the interface to be measured according to a field of view. These processing means comprise at least a computer, a central processing or calculation unit, a microprocessor, and/or suitable software means.

The device according to the invention can also comprise displacement means for displacing the optical element along an axis Z relatively with respect to the measurement device, so as to obtain a displacement of the focal point with respect to the interfaces of the optical element.

FIG. 1 is a diagrammatic representation of a non-limitative embodiment of an interferometric device that can be utilized within the scope of the present invention. The device can in particular be utilized in order to implement the measurement method of the invention.

The interferometer 4000, shown in FIG. 1, is a time-domain low-coherence interferometer.

The interferometer 4000 can operate for example in the infrared. For measuring optical assemblies with antireflective coatings, it can be advantageous to choose for the interferometer a working wavelength different from those for which the antireflective coatings are optimized, in which case they may exhibit a high reflectivity. Thus, an interferometer operating in the infrared is very suitable for measuring optical assemblies intended to be utilized in visible wavelengths.

The interferometer 4000 operates in point mode, i.e. it only makes it possible to acquire a single point 408 at a time of a field of view 108 of the surfaces or interfaces of the optical element 1000 to be measured.

In the embodiment illustrated in FIG. 1, the interferometer 4000 comprises a double Michelson interferometer based on single-mode optical fibres. The double interferometer is illuminated by a fibre light source 402. The light source 402 can be a superluminescent diode (SLD), the central wavelength of which is, for example, of the order of 1300 nm to 1350 nm and the spectral width of which is of the order of 60 nm. The choice of this wavelength corresponds in particular to criteria of availability of the components.

The light originating from the source 402 is directed through a fibre coupler 409 and a fibre 406 to a collimator 407, to constitute the point measurement beam 106. A portion of the beam is reflected in the fibre 406 at the collimator 407, for example at the silica-air or glass-air interface constituting the end of the fibre, in order to constitute a reference wave.

The retroreflections originating, for example, from the interfaces 103 of the optical element 1000 are coupled into the fibre 406 and directed with the reference wave towards a decoding interferometer constructed around a fibre coupler 401. This decoding interferometer has an optical correlator function, the two arms of which are, respectively, a fixed reference 404 and a time-delay line 405. The signals reflected at the reference 404 and the delay line 405 are combined, through the coupler 401, on a detector 403, which is a photodiode. The function of the delay line 405 is to introduce an optical delay between the incident and reflected waves, variable over time in a known manner, obtained for example by the displacement of a mirror.

The length of the arms of the decoding interferometer is adjusted so as to make it possible to reproduce with the delay line 405 the optical path differences between the reference wave reflected at the collimator 407 and the retro-reflections originating from the interfaces of the optical element 1000, in which case an interferogram, the shape and width of which depend on the spectral characteristics of the source 402, and in particular its optical coherence length, is obtained at the detector 403.

Thus, the measurement area of the interferometer 4000, with respect to the collimator 407 or to the interface of the collimator which generates the reference wave, is determined by the optical length difference between the arms of the decoding interferometer, and by the maximum course of the delay line 405. This measurement area corresponds to a coherence area in which the interface to be measured 103 must be found.

In order to obtain items of geometric information, such as optical shapes, of the interfaces 103, the field of view 108 can be scanned according to a plurality of measurement points 408 at different positions (W, Y). To this end, the measurement device can comprise positioning or displacement means, to displace either the optical element 1000, or the collimator 407. For example, the optical element 1000 can be placed on a translation table suitable for displacing along the directions X and Y. It is also possible for the measurement element 1000 to be displaced along one of the axes X or Y and then rotated about the axis Z. Other variants of relative displacement of the optical element with respect to the collimator can of course be produced.

The digital processing means can provide the precise coordinates of the positions X, Y or equivalents, either by reading a displacement sensor, or based on the action applied to a displacement motor of a displacement stage for example, or based on any other suitable means.

The field of view 108 that can be attained for the different interfaces 103 depends in particular on the numerical aperture of the collimator 407 and the curvatures of the surfaces. In fact, in order to obtain a measurement, it is necessary for the specular reflection of the measurement beam 106 on the interface 103 to be coupled back into the collimator 407 and the interferometer 4000.

FIG. 2 is a diagrammatic representation of another example interferometric device that can be utilized within the scope of the present invention.

The interferometer 6000, shown in FIG. 2, is a full-field low-coherence interferometer.

The device 6000 is based on a Michelson or Linnik interferometer formed by a separator element 604, in the shape of a cube or a beam splitter, with a measurement arm which directs a measurement beam 606 towards the optical element to be measured 1000, and a reference arm with a mirror 605 to shape a reference beam 616.

The interferometer 6000 is illuminated by a low-coherence source 612 via a light separator element 603 in the form of a cube or a beam splitter. The source 612 can comprise, for example, a superluminescent diode (SLD), a diode, a thermal light source (halogen lamp etc.) or a supercontinuum source. The source 612 can also comprise a filtering device, for example with a grating and a slit, or interference filters, for adjusting the coherence length to a few tens or a few hundreds of microns. The source 612 can be arranged to emit in visible wavelengths or the near infrared, around one or more wavelengths.

Of course, the separator elements 603, 604 can be non-polarizing, or polarizing and associated with quarter-wave splitters to make lossless couplers.

The measurement 606 and reference 616 beams, reflected into the two arms of the interferometer respectively, are directed via the light beam splitter 603 towards a camera 601 with a sensor 602 comprising a detection matrix, for example of the CMOS or CCD type.

When the optical path difference between the measurement 606 and reference 616 beams is less than the coherence length of the source 612, interferences are obtained on the detector 602.

The device 6000, as shown in FIG. 2, also comprises a focusing lens or objective 607, and a tube lens 609, arranged so as to define an object plane conjugate to an image plane formed on the sensor 602. The reference arm also comprises an objective 610 which also defines, with the tube lens 609, a reference object plane conjugate to the image plane of the sensor 602.

The device 6000 is a full-field image-forming device, which makes it possible to image interfaces 103 of the optical element 1000 according to a field of view 108 which is determined by the field of view of the imaging system and by its numerical aperture at the focusing objective 607. In fact, in order to obtain a measurement, it is necessary for the specular reflection of the measurement beam 606 on the interfaces 103 to be coupled back into the imaging system.

Normally, the device 6000 comprises optical elements for focusing the illumination beam in the rear focal plane of the focusing objective 607 and of the objective 610 of the reference arm. The illumination beams are not shown in the figure for reasons of clarity.

The device 6000 also comprises a first positioning or displacement means 611 for varying the length of the reference arm, for example in the form of a translation stage 611 displacing the reference mirror 605. The objective 610 of the reference arm can also be adjustable to maintain the reference mirror 605 in an object plane conjugate to the image plane formed by the sensor 602.

The device 6000 also comprises a second displacement means 608 the function of which is to displace the object plane conjugate to the image plane formed by the sensor 602, so as for example to sequentially image the successive interfaces 103 onto the sensor 602. This displacement means 608 can comprise a system for displacing the focusing objective 607 or lenses of this objective, for example with a linear or helical translation device. Alternatively or in addition, this displacement means 608 can comprise a device or a translation stage for displacing the device 6000 with respect to the optical element 1000, or vice versa.

With the interferometric devices 4000 or 6000, when a surface or an interface 103 of an optical element appears in the coherence area, an interference structure is obtained on the detector as a result of the interferences between measurement and reference beams for the field of view 108. Geometric information can be deduced from these interference structures.

The device according to the invention, utilizing for example an interferometer according to one of the embodiments shown in FIGS. 1 and 2, can be utilized to implement the steps of the method according to the invention which will be described hereinafter.

FIG. 3 is a diagrammatic representation of a non-limitative embodiment example of a measurement method according to the invention.

The method 10, shown in FIG. 3, comprises a step 12 of relative positioning of a coherence area at an interface to be measured 103 of an optical element 1000.

If the depth of field of the focusing objective 407, 607 is sufficient to obtain a signal from all of the interfaces 103 of the element to be measured, by modifying the optical length of the reference arm, for example by displacing the reference mirror 605 or by varying the length of the delay line 405, the coherence area in which interferences between the measurement 106, 606 and reference 616 beams able to form on the detector 403, 602 is displaced. When this coherence area passes through an interface 103, it is possible to acquire interference signals at all points of the measurable field of view 108.

The coherence area is positioned along the measurement axis, corresponding to the direction of the measurement beam, and in general does not cover the entire interface to be measured, but only a partial area. The coherence area does not obligatorily need to be positioned at the optical axis of the optical element. It can in particular be positioned so that the reflected measurement beam has an angle close to the angle of incidence of the measurement beam.

An example of positioning of coherence areas is shown in FIG. 4. Two successive interfaces to be measured 103*a*, 103*b* of an optical element are shown, as well as two measurement beams 1061, 1062 and two reflected measurement beams 2061, 2062, 2063, 2064 for each of the two interfaces 103*a*, 103*b*. The beams shown delimit the measured area on each interface.

The coherence areas for the two interfaces 103*a*, 103*b* are indicated by rectangles 107*a*, 107*b*, respectively. In the example in FIG. 4, the coherence area 107*a* for the first interface 103*a* is positioned differently from the coherence area 107*b* for the second interface 107*b*. In the areas 107*a*, 107*b* thus positioned, the directions of the reflected measurement beams remain close to the direction of the incident measurement beam. The dimensions of the coherence area are in particular defined by the reflected light maintained within the acceptance angle of the detection system. It should be noted that the coherence areas thus do not necessarily cover the respective apexes A1, A2 (indicated by crosses in FIG. 4) of the measured interfaces 103*a*, 103*b*). These apexes A1, A2 can then be situated with respect to one another at distances below a minimum distance measurable by a measurement device.

According to the embodiment shown in FIG. 3, the method 10 also comprises a step 13 of positioning with respect to a conjugate object plane of the image plane on the sensor 602 at the interface to be measured 103.

In fact, it is preferable to position the interface 103 to be measured in an object plane conjugate to the image plane situated on the sensor 602 or in the collimator 407 at the end of the optical fibre 406, by varying the focusing distance of the measurement beam so that the measuring beam is focused on the interface in question. This makes it possible to optimize the power coupled back into the imaging system and to measure the interface according to a field of view 108 with steeper local gradients, by virtue of a better utilization of the numerical aperture of the collimator 407 or of the focusing objective 607, 707.

The displacement of the coherence area is carried out, for example, by displacing the reference mirror 605.

The displacement of the object plane in order to position it on the successive interfaces is carried out, for example, by varying the distance Z between the collimator 407 or the focusing objective 607 and the optical element to be measured 1000, and/or by varying the focusing distance of the collimator 407, the focusing objective 607 or other optical elements inserted into the measurement beam. The detection of the optimal focusing distance can be carried out based, for example, on a criterion of maximum coupled-back power, or maximum image contrast or interference fringes.

These two displacements, of the coherence area and of the object plane, must thus be carried out in a coordinated manner, where necessary, so as to superpose the coherence area on the object plane in question.

During a step 14 of the method 10, the interface of the element to be measured, which has been positioned in the coherence area and, optionally, in the object plane during the preceding steps 12, 13 as detailed above, is measured by means of the measurement beam 106, 606.

During these interferometric measurements, a set of peaks is obtained corresponding to interferogram envelopes obtained for all of the measured interfaces 103. The peaks are representative of reflections of the measurement beam on the interfaces. The values obtained from the interferograms are optical distances, in the direction Z, and counted with respect to a position reference of the interferometer located for example by construction at the collimator 407 of the interferometer 4000 in FIG. 1, of the interfaces 103 of the different components or lenses 102, for a position (X, Y) in the field of view 108. This makes it possible to know the relative position of each measured interface. The position reference can also be constituted by a reference element added to the interferometer, such as a reference planar beamsplitter, in order to provide one or two additional interface(s).

The measurements are repeated for points (X, Y) of the field of view in order to obtain an interference structure in the field of view, and for all of the interfaces 103 of the optical element.

When the measurements are carried out with a full-field interferometer, as illustrated in FIG. 2, an interference structure resulting from the interferences between measurement and reference beams is directly obtained on the detector for the entire field of view 108.

During a processing phase 16 of the method 10, all of the interference signals for an interface to be measured are processed digitally so as to deduce therefrom an item of geometric information of this interface.

During a first processing step 17, a mathematical interface is constructed based on at least one sub-set of interference signals acquired during the measurement step 14.

To this end, for each interference signal, a characteristic measurement denoting the raw position for each interface is produced.

According to a first embodiment, this characteristic measurement is the relative position of the measured interface. The relative position can be indicated, for example, by the positions of the motors for positioning or relative displacement of the interface with respect to the focusing objective or to the collimator, in the three directions x, y, z as described above.

The measured raw positions are denoted Z(x, y, z, i), where x, y, z denote the position of the displacement or positioning motors, i indicates the interface, varying from 1 to n. The indices 0 and −1 can be provided for an element of reference in the interferometer, such as a planar beamsplitter as indicated above.

For a point mode detection, the interface to be measured is displaced relatively with respect to the measurement beam along axes X, Y, following a series $x_m(d)$, $y_m(d)$, $z_m(d)$ of D displacements, where d is an index of displacement varying from 1 to D, and m indicates "movement". It is then possible to formulate a table $$Z_m(d,i) = Z(x_m(d), y_m(d), z_m(d), i) \quad \text{[Math1]}$$

containing all the measurements of positions of the interfaces measured.

For a full-field detection, the table Z(d,i) can be obtained directly based on the position of the pixels of the sensor:

$$Z_s(d,i) = Z(x_s(d), y_s(d), z_s(d), i), \quad \text{[Math2]}$$

where s indicates "screen".

According to a second embodiment, the characteristic measurement is the amplitude of the peaks corresponding to interferogram envelopes obtained for all of the measured interfaces.

For a detection in point mode, the amplitudes A can be written $$A_m(d,i) = A(x_m(d), y_m(d), z_m(d), i) \quad \text{[Math3]}$$

according to the nomenclature given above, the coordinates $Z_m(d,i)$ being directly replaceable with the amplitudes $A_m(d,i)$.

For a full-field detection, an interference structure resulting from the interferences between measurement and reference beams is directly obtained on the detector for the entire field of view 108. In order to obtain amplitudes $A_s(d,i)$ and/or phase values that make it possible to obtain items of position information (or topography), this interference structure must be digitally processed. Known methods can be implemented, such as algorithms based on phase-stepping interferometry (PSI) or vertical scan interferometry (VSI), or digital holography microscopy (DHM).

The tables of coordinates $Z_m(d,i)$ or $Z_s(d,i)$ and the tables of amplitudes $A_m(d,i)$ or $A_s(d,i)$ can be considered as mathematical representations of the measured interfaces.

For the remainder of the description of the method 10, for the sake of clarity only the mathematical interface $Z_m(d,i)$ will be considered. Of course, the steps described can also be performed utilizing the other expressions, as a function of the detection mode used and the type of characteristic measurements chosen.

During a second processing step 18, an item of geometric information is determined based on the mathematical representation and an expected shape of a section of the interface, for each interface.

During this determination step 18, it is sought to recognize a plausible, or expected, shape of the interface to be measured based on the mathematical interface $Z_m(d,i)$. To this end, the mathematical interface can in particular be compared to a typical surface, such as a spherical surface. A least squares method can be utilized to find the characteristic parameters of the equation describing the typical surface. Other methods can of course be envisaged, such as methods of error minimization search between a known model and a series of measurements.

FIG. 4 shows expected shapes 104a, 104b (indicated by circles and triangles, respectively) for the two measured interfaces 103a, 103b, respectively, of an optical element.

By way of example, step 18 of determining an item of geometric information of an interface is described for a spherical expected shape, for finding the apex of the interface.

It is assumed that the interface to be recognized is essentially a portion of a sphere. For each interface measured, an equation of a portion of a sphere is extracted from the table $Z_m$(d, i) with i fixed, d scanning the retained positions. This extraction is performed, for example, by a least-squares method.

Expressed globally for all of the points of the sphere having a centre ($x_c$, $y_c$, $z_c$), the equation of a sphere of radius R is in the form $$R^2=(x-x_c)^2+(y-y_c)^2+(z-z_c)^2. \quad \text{[Math4]}$$

Expressed locally around a neighbourhood of an apex with the coordinates ($x_A$, $y_A$, $z_A$), the equation of a sphere can also be written by approximation:

$$R_{model}(x,y)\approx\frac{1}{2R}\left((x-x_A)^2+(y-y_A)^2\right)+z_A. \quad \text{[Math5]}$$

In this form, a least squares method can directly provide the values of $x_A$, $y_A$, $z_A$, and the factor 1/(2R) models the apparent curvature of the surface. The minimum distance error between $Z_m$(d,i) and $Z_{model}$(x(d),y(d)) can be expressed explicitly by $$\varepsilon(i)=\sum\nolimits_d\left[(Z_m(d,i)-Z_{model}(x(d),y(d)))^2\right]. \quad \text{[Math6]}$$

At this stage, a points table $$A(i)=(x_A(i),y_A(i),z_A(i)) \quad \text{[Math7]}$$

is obtained, representing the raw positions of each apex.

Then, the distances between the projections of the apexes on the axis Z are calculated:

$$E_z(i)=z_A(i)-z_A(i-1), \quad \text{[Math8]}$$

where i varies between 2 and n.

These distances are called optical distances, since they represent optical delay times of the reflected beam. It is thus appropriate, for the indices i associated with a material other than air, to divide these distances by the refraction indices N(i), so as to obtain geometric distances.

When the measurements have been carried out in full-field mode, an enlargement factor is applied to express the distances between pixels of the sensor as distances in the object plane of the objective. This factor can also take account of the distance at which each interface is detected.

The processing phase 16 thus provides a set of items of geometric information called "semi-raw", on the measured interfaces:

- a list of coordinates $x_A$(i), $y_A$(i) in the frame of reference of the measurement system, for i varying from 1 to n, these coordinates being capable of comprising, for each interface, the positions of characteristic points such as the apexes, vertexes, valleys, etc.,
- a list of the relative positions by comparison with the coordinates of the characteristic points belonging to different interfaces,
- a list of the distances $E_z$(i) between apexes.

Of course, expected shapes other than a spherical shape are possible. For example, for interfaces belonging to a lens that is highly aspherical measured at positions where the lens locally has the shape of a barrel, a part of a circle may not be suitable. Thus, a part of a sphere may be completed with a conicity term usually used in optics for correcting the aberrations appearing at wide aperture angles of lenses.

According to a non-limitative embodiment and with reference to FIG. 3, the processing phase 16 of the method 10 according to the invention comprises a correction step 19 for taking into account the media passed through by the measurement beam. This correction can be applied to the optical or geometric distances and positions obtained in processing step 17.

According to a first example, this correction step 19 is performed utilizing propagation models of the electromagnetic waves through different materials and interfaces up to the interface i in question, including all of the optical components of the interferometer and the interfaces of the optical element to be measured 1000 passed through.

According to a second example, the correction step 19 is performed by calculating a point spread function (PSF) or an optical transfer function (in the Fourier domain) of the optical system passed through by the measurement beam up to the interface i in question, including all the optical components of the interferometer and the interfaces of the optical element to be measured passed through.

The correction step 19 can also be performed utilizing items of design information on the optical element, where they are available. It is possible for example to utilize items of design information, such as the shapes or the nominal curvatures of the interfaces, in order to correct the effect of the interfaces passed through by the measurement beam while implementing for example one of the models described previously. It is thus possible for example to validate the shape of an interface in a field of view with a measurement, then to use the complete nominal shape thereof (in particular for aspherical or "freeform" shapes) in order to correct the measurements of the following interfaces.

The correction step 19 is performed sequentially, in the order of the interfaces passed through of the optical element. Thus, for each interface in question, corrected optical and/or geometric positions and/or distances of the preceding interfaces passed through by the measurement beam are available.

Advantageously, the correction step 19 can be implemented before processing steps 17, 18 described above, so that the latter can be performed on measurement points corrected for the optical propagation effects.

According to the embodiment shown in FIG. 3, the method 10 also comprises a phase 20 of analysis of the items of geometric information obtained in the processing phase 16.

According to an example, decentrations can be determined during the analysis phase 20. The coordinates of the apexes of the different interfaces make it possible to know the decentration values of one interface with respect to another.

According to another example, distances $E_z(i)$ between apexes indicate the thicknesses of lenses and the distances between these latter of an optical element.

According to an advantageous embodiment, the analysis phase 20 of the method according to the invention comprises a step 22 of correcting an angle of an optical axis of the optical element with respect to a measurement axis, before a repetition of the processing steps 17, 18 and optionally of the step 19 of correction.

During the processing phase 16 as described above, the coordinates are calculated in a system defined by the measurement axis Z and the axes X and Y of the measurement device.

In order to perform this step 22, a new reference system associated with the optical element can be defined. It is for example possible to define a reference plane based on:

- characteristic areas of the barrel of the optical element, or
- characteristic areas of the components of the optical element such as flat peripheral areas of the measured lens, or
- reference points associated with other measured interfaces of the optical element.

These reference points can be used to define a new system of coordinates.

In this system, a central axis can be calculated as passing, for example, through the barycentre of three reference points. These three reference points such as, for example, characteristic peripheral points of a lens, distributed at the same distance from the centre of an interface of the lens. These three points define a plane P, the normal of which then characterizes the central axis of reference Γ of the optical element.

In an aspherical lens having a barrel with rotational symmetry, these points can be three vertexes of the barrel.

For each interface i, the corrected geometric coordinates $x_{Ap}(i)$, $y_{Ap}(i)$, $z_{Ap}(i)$ define a point M(i), the distance of which is calculated vectorially by a vector V(i) to the straight line Γ. By choosing two new axes XI, YI as projection of the axes X, Y on the plane P by the direction of the straight line Γ, the coordinates of V(i) in XI, YI provide the coordinates $dx_{AI}(i)$, $dy_{AI}(i)$ with respect to this central axis. The table of coordinates $dx_{AI}(i)$, $dy_{AI}(i)$ then provide the centring values of the interfaces with respect to the central axis defined above. Similarly, the thicknesses E(i) can be recalculated as distances EI(i), i.e. the distances between the points of projection of the apexes of each interface on Γ.

It should be noted that the apexes thus calculated can be slightly different from those obtained without correction.

The normal vector V(i) can then be compared angularly to the measurement axis. Items of angular offset information of the interfaces with respect to the defined reference axis (for example the measurement axis) can thus be deduced.

Thus, by virtue of the method according to the invention, defective or off-specification optical components in an optical element can be identified during the analysis phase 20. This identification can be performed, for example, by comparing measurements of distances, thicknesses or shapes of the surfaces with reference values originating from the design of the optical element. Non-compliant values, such as defective thicknesses and/or surface shapes, or components incorrectly positioned along the optical axis, having a non-compliant space between the components, can thus be detected.

Of course, the invention is not limited to the examples that have just been described, and numerous modifications may be made to these examples without exceeding the scope of the invention.

The invention claimed is:

1. A measurement method, for measuring an item of geometric information of an interface to be measured of an optical element comprising at least two interfaces, the method being implemented by a measurement device comprising interferometric measurement means with at least one optical sensor and a low-coherence source, configured to direct a measurement beam towards the optical element so as to pass through at least one of the at least two interfaces, and to be reflected by the interface to be measured and generate a reflected measurement beam, and to selectively detect an interference signal resulting from interferences between the reflected measurement beam and a reference beam, the device also comprising positioning means and digital processing means, said method comprising the following steps:

- relative positioning, by the positioning means, of a coherence area of the interferometric measurement means at an interface to be measured;
- measuring the interface by the interferometric measurement means, so as to produce a plurality of interference signals corresponding to a plurality of measurement points on the interface; and
- processing interference signals by the digital processing means, the processing comprising the following steps:
  - constructing a mathematical interface based on at least one sub-set of interference signals for the interface; and
  - determining, based on the mathematical interface and an expected shape of at least one first section of the interface, an item of geometric information of the interface to be measured, the step of determining the geometric information being performed by the following steps:
  - deducing parameters of a model or of an analytical formulation of the first section of the interface; and
  - modelling the shape of a second section of the interface to be measured, based on the parameters deduced, the second section of the interface being equal to or different from the first section of the interface.

2. The method according to claim 1, characterized in that the first section of the interface comprises at least one surface element.

3. The method according to claim 1, characterized in that the step of constructing the mathematical interface is performed by producing a measurement including an item of relative position information of the interface and/or a measurement of amplitude of the interference signal, for each interference signal of the sub-set of interference signals.

4. The method according to claim 1, characterized in that the expected shape of the interface is expressed by an interpolation function for interpolating the measurement points.

5. The method according to claim 1, characterized in that the expected shape of the interface is expressed by a theoretical profile of at least the first section of the interface.

6. The method according to claim 1, characterized in that it also comprises a step of analysis of the interface by utilizing the geometric information, so as to produce at least one of the following items of information:

a decentration and/or a tilt of the interface;

a relative position, decentration and/or tilt of one interface with respect to another;

a distance between characteristic points of two interfaces.

7. The method according to claim 1, characterized in that at least the step of positioning the coherence area and the step of measurement are implemented sequentially for measuring the geometric information of different interfaces to be measured.

8. The method according to claim 1, characterized in that the step of processing the interference signals also comprises a correction step taking into account an item of geometric information of the interfaces passed through by the measurement beam, in order to obtain an item of geometric information of the interface to be measured.

9. The method according to claim 1, characterized in that it also comprises a step of correcting the angle of an optical axis of the optical element with respect to a measurement axis.

10. The method according to claim 1, characterized in that the step of processing the interference signals implements a calculation method by digital holography.

11. The method according to claim 1, characterized in that it is implemented to measure the shapes and/or the positions of the interfaces of an optical element in the form of an optical assembly with lenses, such as a smartphone objective, the interfaces comprising the surfaces of the lenses.

12. A measurement device, for measuring an item of geometric information of an interface to be measured of an optical element comprising at least two interfaces, the device comprising:

interferometric measurement means comprising at least one low-coherence light source and at least one optical sensor, configured to:

form at least one measurement beam and at least one reference beam;

direct the measurement beam towards the optical element so as to pass through at least one of the at least two interfaces and to be reflected by the interface to be measured and generate a reflected measurement beam; and selectively detect a plurality of interference signals resulting from interferences between the reflected measurement beam and the reference beam for a plurality of measurement points on the interface;

positioning means configured to position relatively a coherence area of the interferometric measurement means at the interface to be measured; and digital processing means configured to:

construct a mathematical interface based on at least one sub-set of interference signals for the interface; and determine, based on the mathematical interface and an expected shape of at least one first section of the interface, an item of geometric information of the interface to be measured, the digital processing means being configured to:

deduce parameters of a model or of an analytical formulation of the first section of the interface; and model the shape of a second section of the interface to be measured, based on the parameters deduced, the second section of the interface being equal to or different from the first section of the interface.

13. The device according to claim 12, characterized in that the interferometric measurement means comprise an interferometric sensor, called point-mode interferometric sensor, configured to detect a point interference signal at a point of the field of view.

14. The device according to claim 12, characterized in that the interferometric measurement means comprise an interferometric sensor, called full-field interferometric sensor, configured to detect a full-field interference signal in the field of view.

15. The device according to claim 12, characterized in that the positioning means are configured to position the coherence area successively at different interfaces of the optical element.

16. The device according to claim 12, characterized in that it also comprises displacement means configured to displace the optical element with respect to the measurement beam in a plane perpendicular to a measurement axis.

* * * * *